UNITED STATES PATENT OFFICE.

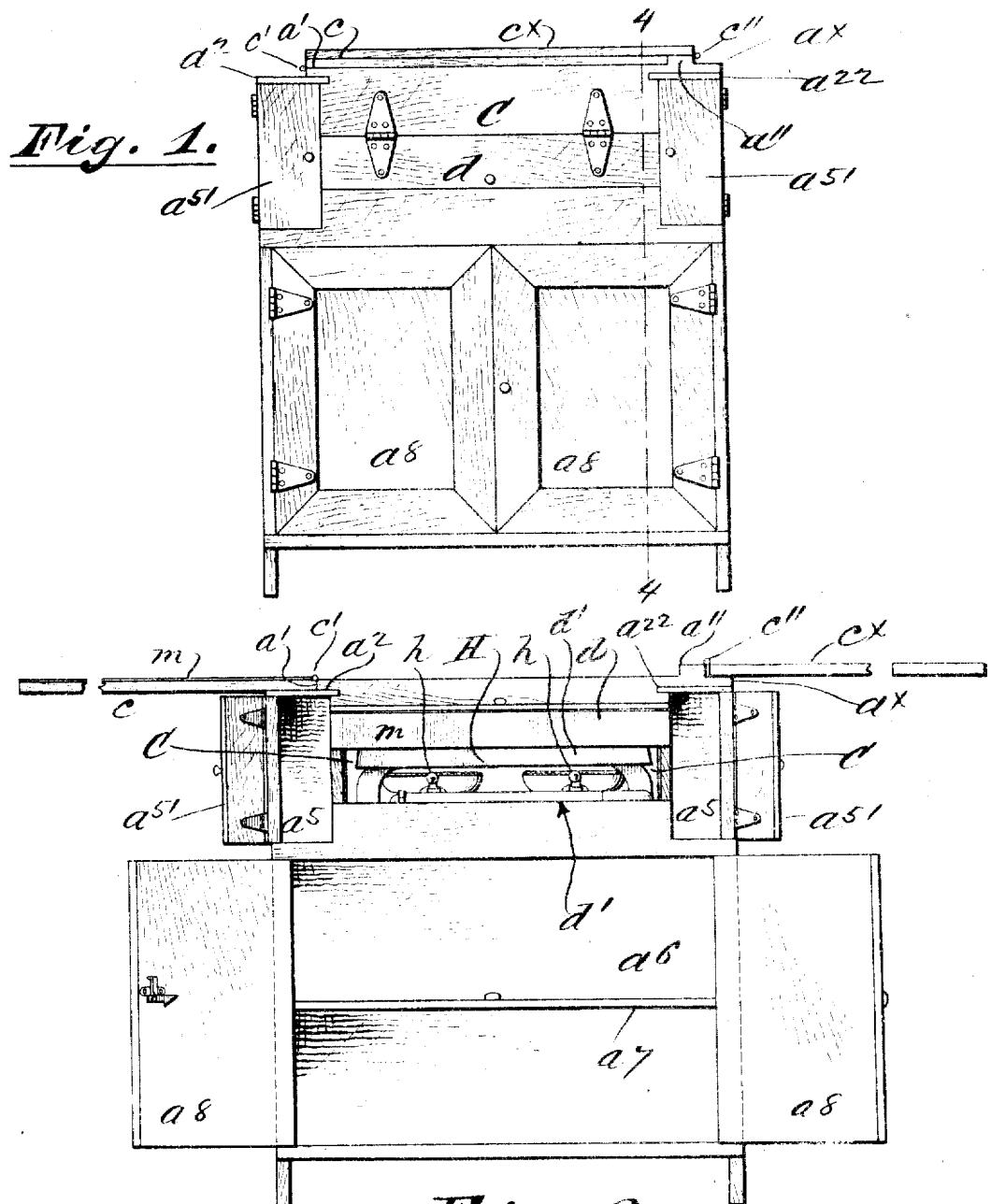

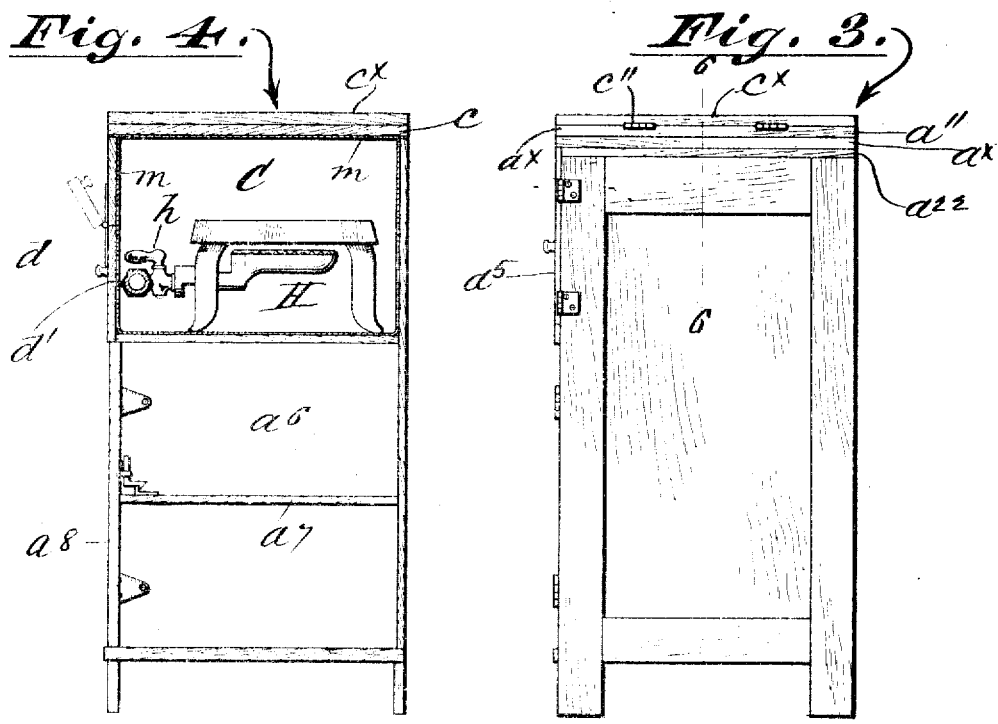
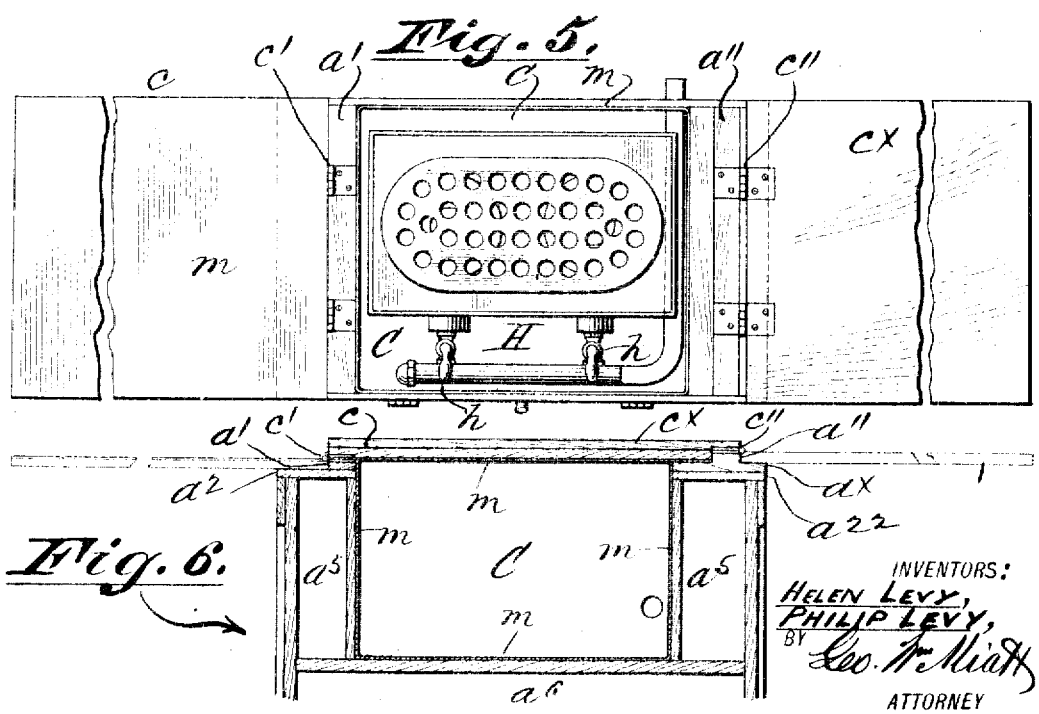

HELEN LEVY AND PHILIP LEVY, OF ROCKAWAY BEACH, NEW YORK.

COOKING-CABINET.

1,332,671.   Specification of Letters Patent.   Patented Mar. 2, 1920.

Application filed October 28, 1919. Serial No. 334,035.

*To all whom it may concern:*

Be it known that we, HELEN LEVY and PHILIP LEVY, citizens of the United States, and residents of Rockaway Beach, in the county of Queens and State of New York, have invented certain new and useful Improvements in Cooking-Cabinets, of which the following is a specification.

The object of our invention is the provision of a neat, simple, compact cabinet adapted for cooking purposes where economy of space is a desideratum or necessity, as in small urban living apartments where the utilization of all available space is important.

The invention consists in the specific combination, and arrangement of parts described and claimed, distinctive features being the construction of the heater compartment; the means provided for access thereto; the utilization of the cover or covers thereof as extension tables, and of all space included within the cabinet casing for the accommodation and storage of cooking utensils, dishes, cutlery, etc., all as hereinafter fully set forth.

In the accompanying drawings,

Figure 1, is a front elevation of our cooking cabinet, closed;

Fig. 2, is a front elevation thereof, fully opened up to show the several compartments;

Fig. 3, is an end elevation of the cabinet, closed;

Fig. 4, is a vertical section of the cabinet taken upon plane of line 4—4, Fig. 1, showing the heating means in elevation;

Fig. 5, is a top view of the cabinet with the covers open and extended horizontally;

Fig. 6, is a section of the upper portion of the cabinet, taken upon plane of line 6—6, Fig. 3.

Our cooking cabinet is preferably, although not necessarily, made of wood, in which case the cooking compartment C, is lined with sheet metal $m$, as is the cover $c$, and door $d$, thereof. One end of the cover $c$, is hinged at $c'$, to an abutment $a'$, on the top of the casing, said abutment $a'$, being of a height equivalent to the thickness of the cover $c$, so that when the latter is opened up horizontally as in Figs. 2, 5 and 6, it will rest upon the side top $a^2$, of the casing and be supported thereby. In like manner a supplementary cover leaf $c^x$, is hinged at $c''$, to an abutment $a''$, on the opposite side of the top of the casing,—said abutment $a''$, being of a height sufficient to admit of the overlap of the auxiliary cover leaf $c^x$, on top of the primary cover $c$, when the two covers $c$, $c^x$, are inturned one upon the other as shown in Figs. 1, 3, 4 and 6, of the drawings. The abutment $a''$, also is made with a horizontal rest $a^x$, for the support of the auxiliary cover leaf $c^x$, when the latter is unfolded and extended beyond the body of the cabinet, for use as a table on that side of the cabinet, as shown in Figs. 2 and 5, and in dotted lines in Fig. 6.

The lateral extensions or side top portions $a^2$, $a^{22}$, of the cabinet A, thus furnished for the support of the covers $c$, $c^x$, when the latter are extended for use as tables or auxiliary supporting surfaces, cover cubby spaces $a^5$, $a^5$, at either end of the cooking compartment C, which cubby spaces may be provided with hinged doors or closures $a^{51}$, $a^{51}$,—said cubby spaces $c^5$, $c^5$, affording convenient accommodation for the storage of cutlery, etc.

Below the cooking compartment C, and cubby spaces $a^5$, $a^5$, we form our cabinet with a cupboard $a^6$, provided with one or more shelves $a^7$, and with closures $a^8$, preferably in the form of hinged doors, as shown. The cupboard is for the storage of cooking utensils, crockery, etc., in convenient juxtaposition to the cooking compartment C, and the table leaves $c$, $c^x$, when open and extended.

The heating means H, contained within the cooking compartment C, may consist of a gas burner as shown in the drawings by way of illustration, or of an electric heating device, or any other available form of heater, as may be found most expedient. The walls of the cooking compartment are sufficiently high to isolate and protect the heater H, and cooking utensils positioned thereon, from contact with extraneous objects; and the aperture $d'$, in the front wall of said cooking compartment, closed normally by the door $d$, affords convenient access to the means for regulating the heater, as for instance the gas cocks $h$, $h$, shown in Figs. 2, 4 and 5.

When closed and not in use for cooking purposes, in which case the heating means, cooking utensils, cutlery, and dishes are entirely hidden from view, our cabinet may be utilized for other purposes, as a side table or support for books, magazines, etc.; and when so closed it occupies comparatively little space, and affords no indication of the purpose for which it is primarily intended, becoming in appearance an ordinary article of furniture, the storage capacity of which however is an important consideration in a small living compartment which has to function as kitchen, dining room, and living room all in one.

In this connection the utilization of the leaves $c$, $c^x$, as table surfaces is important, affording accommodation for two or even four or more persons in the service of meals.

Another advantage of our construction of cooking cabinet is the safety it affords from accidental contact with the heating means, an important consideration in close quarters, especially where children are to be safeguarded.

What we claim as our invention and desire to secure by Letters Patent is,

1. A cabinet of the character designated, comprising a medial countersunk cooking compartment, a cubby compartment at each extremity of said cooking compartment provided with a vertical front closure, a cover for the cooking compartment hinged to the top of one of the cubby compartments and adapted to be sustained thereby when in extended open position, a longitudinal regulator opening in the front wall of the cooking compartment and a closure therefor, and a cupboard with closures below said cooking compartment, for the purpose set forth.

2. A cabinet of the character designated, comprising a medial countersunk cooking compartment, a cubby compartment at each extremity of said cooking compartment provided with a vertical front closure, two covers for the cooking compartment each of the full length thereof and foldable one over the other, each cover hinged to the top of one of the cubby compartments and adapted to be sustained thereby when in extended open position, a longitudinal regulator opening in the front wall of the cooking compartment and a closure therefor, and a cupboard with closures below said cooking compartment, for the purpose described.

3. A cabinet of the character designated, comprising a casing containing a medial countersunk cooking compartment, a cover hinged to the casing and adapted when in an open position to rest upon the side top of the said casing and be supported thereby, an auxiliary cover leaf adapted to overlap the first-named cover when the two covers are inturned, and abutments to which said covers are hinged, one of said abutments being formed with a horizontal rest for the support of the auxiliary leaf when the latter is unfolded.

HELEN LEVY.
PHILIP LEVY.

Witnesses:
GEO. WM. MIATT,
DOROTHY MIATT.